D. G. ROOS.
ELECTRIC SWITCH.
APPLICATION FILED MAR. 4, 1916.

1,342,229.

Patented June 1, 1920.
2 SHEETS—SHEET 1.

Inventor:
Delmar G. Roos,
by Emery Booth Janney & Varney
Attys.

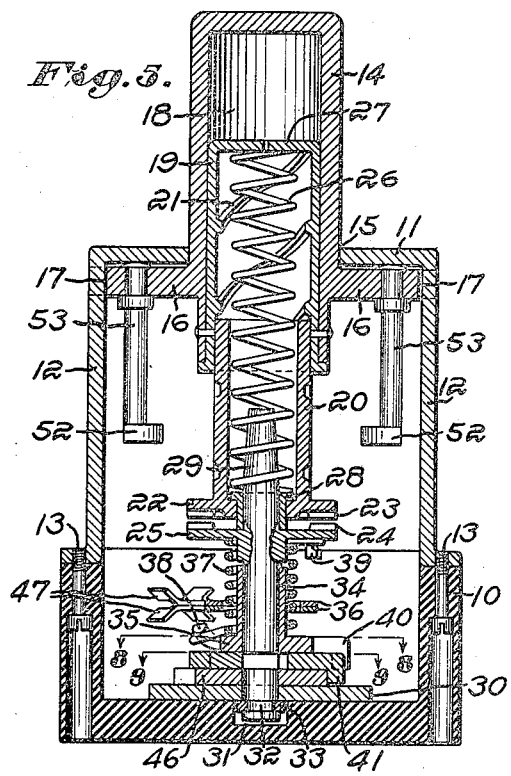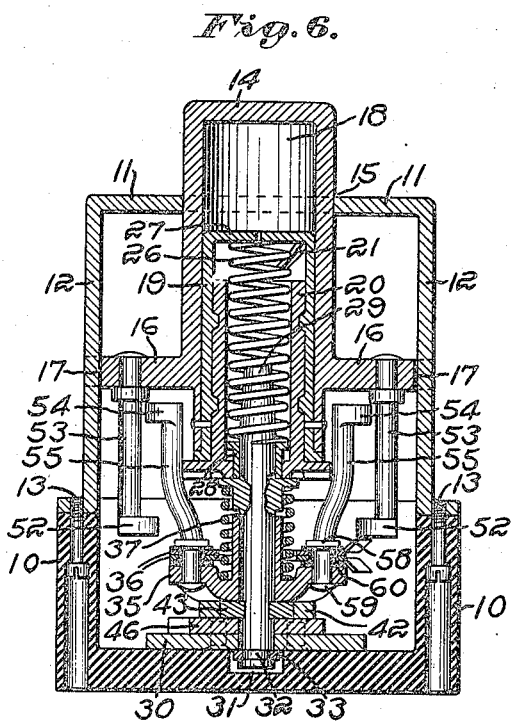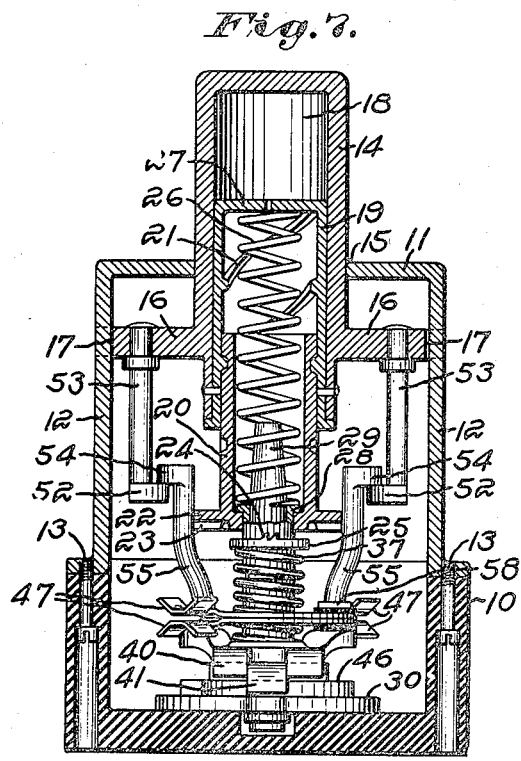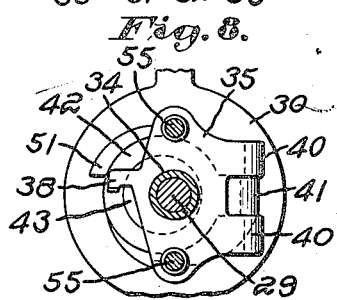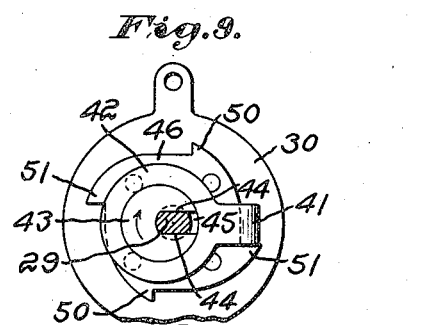

UNITED STATES PATENT OFFICE.

DELMAR G. ROOS, OF FAIRFIELD, CONNECTICUT, ASSIGNOR TO THE LOCOMOBILE COMPANY OF AMERICA, OF NEW YORK, N. Y., A CORPORATION OF WEST VIRGINIA.

ELECTRIC SWITCH.

1,342,229.      Specification of Letters Patent.      Patented June 1, 1920.

Application filed March 4, 1916. Serial No. 82,238.

*To all whom it may concern:*

Be it known that I, DELMAR G. ROOS, a citizen of the United States, and a resident of Fairfield, county of Fairfield, and State of Connecticut, have invented an Improvement in Electric Switches, of which the following description, in connection with the accompanying drawings, is a specification, like characters on the drawings representing like parts.

This invention relates to switches and is more particularly concerned with an indicating switch having means to indicate its condition, that is to say, to show whether the current is on or off.

My invention will be best understood by reference to the following specification, when taken in connection with the accompanying drawings of one specific embodiment thereof, while its scope will be more particularly pointed out in the appended claims.

In the drawings:

Fig. 5 is a central vertical section of the switch in a position corresponding to Fig. 1;

Fig. 6 is a sectional view similar to Fig. 5, but showing the actuating element or push button fully depressed;

Fig. 7 is another sectional view similar to Figs. 5 and 6, but showing the actuating element or push button partially retracted, the switch in this position being "off";

Fig. 8 is a detail plan section on line 8—8 of Fig. 5; and

Fig. 9 is a detail plan section on line 9—9 of Fig. 5.

Figure 1:
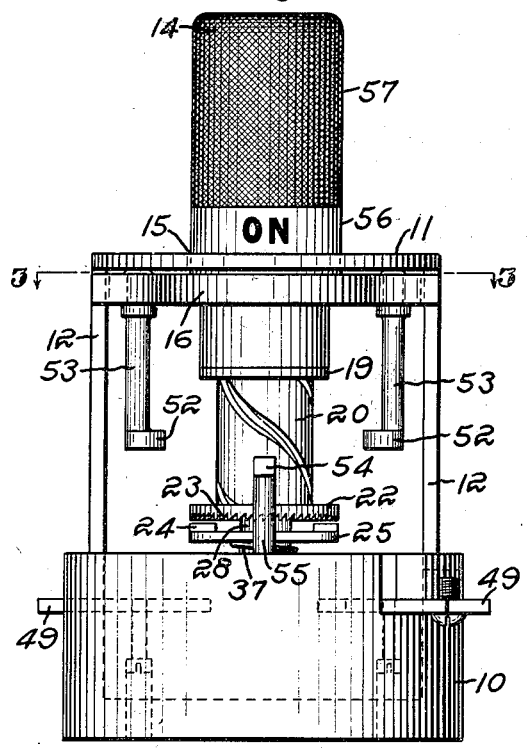
Figure 1 is an elevation of one specific switch embodying my invention, showing the parts in the position which they occupy when the switch is in its "on" position.

The switch which I have selected for illustration belongs to that general type in which inward movement of an actuating member in the form of a push button imparts to a switch element a step-by-step rotative movement, one pressure of the push button completing the circuit, and the next pressure breaking the circuit. I will first describe the characteristic features of this general type of switch, and will follow such description with an explanation of the features which constitute my present improvement for making a switch self-indicating,—that is to say, showing whether it is in its "on" or "off" position.

Referring to the drawings, and to the embodiment of my invention which I have selected for illustration, I have there shown a switch of a general type commonly in use, having a base 10 preferably formed of suitable insulating material, as for example porcelain, and constituting a support or mounting for the switch mechanism, which I will now describe.

Mounted on the base 10 is a support 11, herein in the form of a yoke provided with a pair of posts 12, the latter secured to the base by suitable means, herein a pair of screws 13. The yoke 11 constitutes a support and guide for an actuating member 14 in the form of a push button which is mounted to move axially in an aperture 15 provided in the yoke. This push button is herein provided with a pair of arms 16, each of which is notched at 17 to receive one of the posts 12, the latter constituting guides to enforce a rectilinear movement of the push button. The push button 14 is herein provided with a chamber 18, in which is disposed a nut 19 secured in fixed position therein, and coöperating with a screw 20. The nut and screw have steep-pitched threads 21, so that axial movement of the nut which is held against rotation produces rotative movement of the screw.

Suitably formed on or secured to the screw 20 is a clutch member 22, provided with teeth 23 of ratchet form, adapted to coöperate with similar teeth 24 of an opposed clutch member 25. These clutch members are normally held in separated relation by a spring 26 disposed axially within the nut 19 and screw 20, which are chambered to receive the spring, the latter bearing at one end against an abutment 27 at one end of the nut, and the other end of the spring bearing against a shouldered bushing 28 inserted axially in the screw 20. This spring performs two functions: First, it constantly tends to move the push button toward its initial position, and, second, it presses the shouldered bushing 28 against the clutch member 25, and constantly tends to disengage the clutch members from each other.

The clutch member 25 is suitably formed on or secured to a shaft 29, which is journaled axially in the bushing 28. This shaft is also journaled in a fixed bearing plate 30, and passes through the latter into a chamber 31 provided in the base 10. That portion of the shaft which is in this chamber is provided with an annular groove 32, in which is disposed a suitable washer 33, which, by engagement with the underside of the bearing plate 30, prevents endwise movement of the shaft in an upward direction.

Loosely mounted on the shaft 29 is a sleeve 34 provided with a laterally-extending flange 35, which constitutes a carrier for a pair of switch plates 36 insulated therefrom. A helically coiled torsional spring 37, encircling the sleeve 34, is secured at one end to the latter, and at its other end to the clutch member 25. In the present instance, one end of the spring is secured to a lug 38 formed on the flange 35, while the other end is secured to a lug 39 formed on the clutch member 25. The flange 35 is provided with a pair of jaws 40 having interposed between them a lug 41 projecting laterally from an eccentric strap 42. The latter encircles an eccentric 43 suitably secured to the shaft 29. In the present instance, the latter is provided with opposite grooves 44, whose width is substantially equal to the thickness of the eccentric 43 (see Fig. 6), and the latter is provided with a slot 45, whose width as viewed in Fig. 9 is such as to receive between its opposed faces the flattened portion of the shaft 29 formed by the grooves 44, whereby the eccentric is prevented from turning on the shaft. Thus it will be seen that the sleeve 34, with its flange 35, and the eccentric strap 43 with its lug 41, constitute a rotating couple, the strap and its lug having capacity for movement in a generally radial direction under the influence of the eccentric, but having no capacity for rotation with relation to the sleeve 34 and its flange 35, this being because of the provision of the jaws 40, which embrace the lug 41.

Fixedly secured to the bearing plate 30 is a ratchet 46, whose purpose is to lock the rotating couple against rotation at certain definite angular positions corresponding to the proper positions of the rotating switch elements 36. The latter are herein shown in the form of thin plates of suitable conducting material, having pairs of terminal portions 47 spaced apart to receive between them terminal portions 48 of a pair of fixed contact plates 49 constituting terminals for the line wires. It is evident that when the rotating switch elements 36 are in contact with the stationary switch elements 48, the circuit is completed, and the switch may be said to be in its "on" position; while, on the other hand, if the rotating switch element be turned from such position through an angle of 90 degrees for example, the circuit will be broken and the switch may be said to be in an "off" position. It must also be evident that it will require but a quarter turn each time to change the switch from an "off" position to an "on" position. To this end, therefore, the ratchet 46 is herein provided with four teeth placed approximately 90 degrees apart. In the present instance, as distinguished from former practice, two of these teeth, designated 50—50, are of one depth, while a second pair of teeth, designated 51—51, are of a greater depth. The purpose of this difference in depth will be presently explained.

It will now be evident that when the lug 41 is in engagement with one of the teeth of the ratchet just described, the rotating couple and the switch plate carried thereby are locked against rotation, and will remain so until the eccentric 43 has been rotated sufficiently to move the lug 41 radially outward beyond the end of the ratchet tooth by which it is held against rotation. It will also be evident that, during such turning motion, the spring 37 should be wound so as to propel the rotating couple at a high rate of speed after the moment of release. This takes place in the following manner: The first effect of depression of the push button 14 is naturally to tend to rotate the screw 20 alone, but the spring 26, being comparatively weak, will yield and instantly allow the teeth 23 of the clutch member 22 to be brought into engagement with the teeth 24 of the clutch member 25, whereupon further rotation of the screw 20 is accompanied by a like rotation of the clutch member 25 and shaft 29. Thus the spring 37 is wound during the time when the eccentric 43 is moving the lug 41 in an outward direction. This being the case, it is evident that the instant the lug 41 passes beyond the point of one of the ratchet teeth, the previously wound spring 37 will propel the rotating couple and parts carried thereby until the lug 41 reaches the next tooth of the ratchet, thus stopping the rotating couple at an angular distance of 90 degrees from its last stopping point.

In the use of switches of this type, it is desirable to provide some means for indicating at once to the user whether the switch is in an "on" or "off" position. Attempts have heretofore been made to accomplish this result, but for various reasons have not met with complete success. As heretofore constructed, in switches of this type, the push button always had but one position when not under pressure of the thumb or finger of the user,—that is to say, the push button always returned to exactly the same position each time after being pressed. In the present embodiment of my invention, I have provided means which I will now describe for causing the push button to return part way only toward its extreme outward position every other time the push button is pressed. In other words, when the switch is in one position, the push button will occupy its extreme outward position; when the button is pressed the next time, it will return part way only; and when it is pressed the next time, it will return to the first position, and so on. In the present example, this result is accomplished by providing the push button arms 16 with a pair of stops 52 carried by standards 53 and projecting inwardly therefrom, and by providing the rotating couple with a pair of stops 54 carried by standards 55 and projecting outwardly therefrom.

Figure 4:
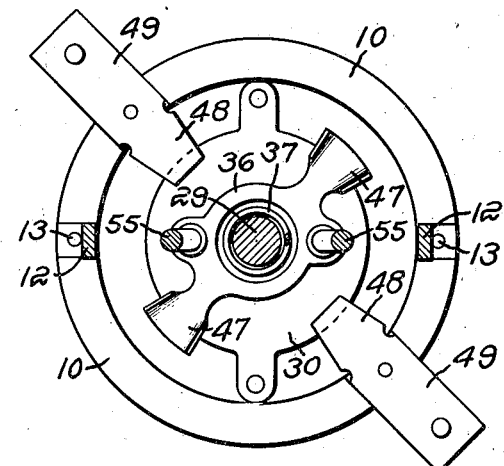
Fig. 4 is a plan section on line 4—4 of Fig. 2.

When the switch is in its "on" position, the stops 54 stand in a plane at right angles to the plane of the stops 52, as will be evident from an inspection of Fig. 1. When, however, the push button 14 is pressed inwardly from the position shown in Fig. 5 to the position shown in Fig. 6, the rotation of the rotating couple through an angle of 90 degrees, caused by the inward movement of the push button, brings the stops 54 into the same plane as the stops 52. The latter at this moment occupy the extreme inward position as shown in Fig. 6, but when the push button is released, they encounter the stops 54 as shown in Fig. 7, and thus limit the outward movement of the push button. This position of the stops corresponds to an "off" position of the switch (see Fig. 4). The next inward movement of the push button 14 carries the stops 52 once more to their innermost position shown in Fig. 6, and results in the stops 53 being carried through an angle of 90 degrees to the position indicated in Fig. 1, so that the push button when released will return to its extreme outward position, as shown in Fig. 1. It must be evident that, since at one time the push button has a short stroke and at the next time a long stroke, the radial movement which it will impart to the lug 41 will differ according to the length of stroke, and, for this reason, the teeth 51 are made deeper than the teeth 50, the two deep teeth corresponding to the long strokes of the push button and the two shallower teeth corresponding to the short strokes.

Figure 2:
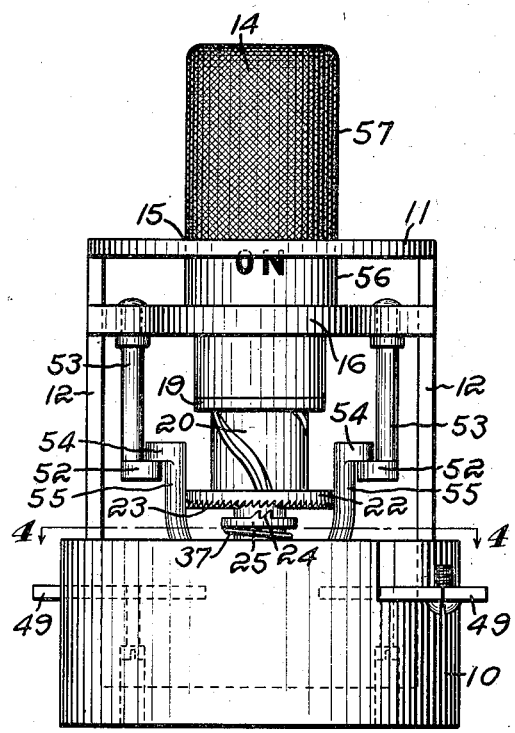
Fig. 2 is an elevation similar to Fig. 1, but showing the parts in the position which they occupy when the switch is in its "off" position.
Figure 3:
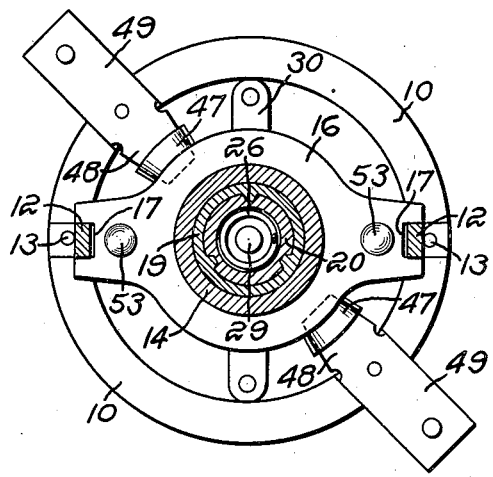
Fig. 3 is a plan section on line 3—3 of Fig. 1.

The condition of the switch, that is to say, whether it is in its "on" or "off" position, may be indicated in any suitable manner. One such way of indicating its condition is to provide the push button 14 with a light-colored band 56, and a dark-colored band 57, so placed upon the button that, when the latter is in its outermost position, the light-colored band will show, and its presence will indicate that the switch is in its "on" position, but when upon the next pressure of the button, it returns part way only, the light-colored band will not show, and this will indicate that the switch is in its "off" position. Another convenient means for indicating the condition of the switch is to mark upon the side of the push button the word "on," as indicated in Figs. 1 and 2, or some other suitable word or symbol, which in the outermost position of the button will be visible (see Fig. 1), but on the next pressure of the push button, will become hidden by the yoke 11, or such other shell or cover as is used to form the front mounting for the switch.

The switch plates 36 may be secured to the rotating carrier 35 by any suitable means, but in the present instance, I have found it convenient to employ the posts 55 to perform this additional function, such posts to this end being shouldered at 58 and extended through the switch plates, as well as the carrier 35, and riveted at 59. Insulating bushings 60 serve to insulate the switch plates 36 and the posts 55 from each other and from the carrier 35.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:

1. In a switch, the combination of an actuating element; a pair of relatively movable switch elements; mechanism operated by successive working strokes of said actuating element to move said switch elements relatively to complete and interrupt the communication controlled thereby, said mechanism including a switch-element propelling spring energized by movement of said actuating element, and means to prevent propulsion of the movable switch element during a substantial period of energization of spring and to release the movable switch element and allow the same to be propelled by said spring unrestrained by said actuating element, means tending to restore said actuating element to its initial position after each actuation; and means for limiting the action of said actuating element so that it shall occupy different normal positions corresponding to different relative positions of said switch elements.

2. In a switch, the combination of an actuating element; a pair of relatively movable switch elements, mechanism operated by successive working strokes of said actuating element to move said switch elements relatively to complete and interrupt the communication controlled thereby, said mechanism including a switch-element propelling spring energized by movement of said actuating element in one direction, and means to prevent propulsion of the movable switch element during a substantial period of energization of spring and to release the movable switch element and allow the same to be propelled by said spring unrestrained by said actuating element during continued application of force by said actuating element on said spring; means tending to restore said actuating element to its initial position after each actuation and means for limiting the action of said actuating element so that it shall occupy different normal positions corresponding to different relative positions of said switch elements.

3. In a switch, the combination of a push-button; switch mechanism operated thereby including a pair of relatively movable switch elements, a spring distinct therefrom tending to move said switch elements relatively, and means to hold said relatively movable switch elements in restraint during energization of said spring and to release said switch elements, and allow them to be moved instantaneously by the stored-up power of said spring; means tending to restore said push button to its initial position after each actuation; and means for limiting the motion of said push-button so that it shall be returned by said spring to different normal positions corresponding to positions of said switch mechanism.

4. In a switch, the combination of a push-button; mechanism actuated thereby including a rotary switch element, a spring tending to restore said push-button to a normal position after each actuation of said mechanism and a spring to rotate said switch element, and means to hold said switch element stationary during continued movement of said push-button in opposition to the second-mentioned spring and to release said switch element and allow the same to be propelled by the second-mentioned spring during continued pressure on said push-button; and means for limiting the motion of said push-button so that it shall return to one position corresponding to one position of said switch element and to return to another position corresponding to another position of said switch element.

5. In a switch, the combination of a push-button; a rotary switch element; a spring operatively interposed between said push-button and said switch element, and tending to restore said push button to an initial position; mechanism to cause a step-by-step rotation of said switch element, said mechanism including a second spring energized by movement of said push-button in one direction and tending to rotate said switch element, and means to hold said switch element stationary during energization of said second spring and to release said switch element during further energization of said second spring and to allow the latter to propel said switch element; and means to limit the return of said push-button to one position corresponding to one position of said switch element and to another position corresponding to another position of said switch element.

6. In a switch, the combination of an actuating element; a pair of relatively movable switch elements; mechanism operated by successive working strokes of said actuating element to move said switch elements relatively to complete and interrupt the communication controlled thereby, said mechanism including a switch-element propelling spring energized by movement of said actuating element, and means to prevent propulsion of the movable switch element during a substantial period of energization of spring and to release the movable switch element and allow the same to be propelled by said spring unrestrained by said actuating element; and means distinct from said switch elements for limiting the action of said actuating element so that it shall occupy different normal positions corresponding to different relative positions of said switch elements, the last-mentioned means including coöperating stops, one carried by said actuating element and the other carried in unison with said movable switch element and movable into and out of the path of the one in accordance with different successive positions of said movable switch elements.

7. In a switch, the combination of a push-button; mechanism actuated thereby including a rotary switch element, a spring tending to restore said push-button to a normal position after each actuation of said mechanism and a spring to rotate said switch element, and means to hold said switch element stationary during continued movement of said push-button in opposition to the second-mentioned spring and to release said switch element and allow the same to be propelled by the second-mentioned spring during continued pressure on said push-button; and means for limiting the motion of said push-button so that it shall return to one position corresponding to one position of said switch element and to return to another position corresponding to another position of said switch element, the last-mentioned means including coöperating, relatively-rotatable, coöperating stops, one carried by said push-button and the other carried in unison with said rotary switch element and rotating into and out of the path of the one in accordance with different successive positions of said rotary switch element.

8. In an electric switch, the combination of a push button, yielding means tending to restore said push button to an initial position, a rotary switch carrier, a switch element carried by said carrier, mechanism actuated by movement of said push button, for imparting a step-by-step rotative movement to said carrier, and means to permit the return of said push button to its fullest extent following one actuation and to limit the return of said push button to a partial return only following the next actuation, the last-mentioned means including one or more stops carried by said carrier and one or more stops carried by said push button and limiting the outward movement of the latter in certain positions of said switch element.

In testimony whereof I have signed my name to this specification, in the presence of two subscribing witnesses.

DELMAR G. ROOS.

Witnesses:
F. G. OSBORN,
A. C. SCHULZ.